No. 773,643.

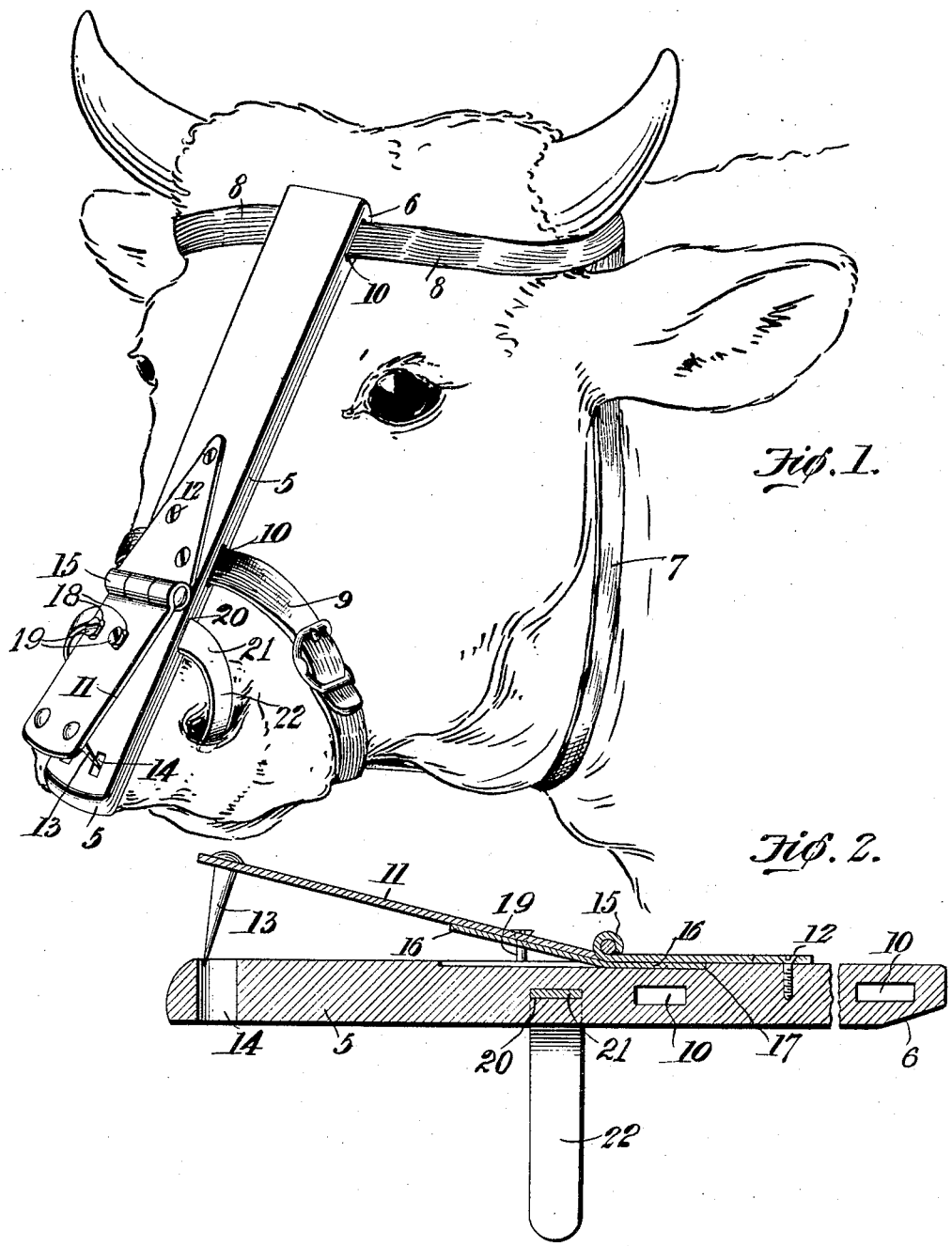

Patented November 1, 1904.

UNITED STATES PATENT OFFICE.

SAMUEL G. HOLLOWAY, OF NOBOB, KENTUCKY.

NOSE-CHECK FOR CATTLE.

SPECIFICATION forming part of Letters Patent No. 773,643, dated November 1, 1904.

Application filed December 28, 1903. Serial No. 186,827. (No model.)

*To all whom it may concern:*

Be it known that I, SAMUEL G. HOLLOWAY, a citizen of the United States, residing at Nobob, in the county of Barren and State of Kentucky, have invented a new and useful Nose-Check for Cattle, of which the following is a specification.

This invention relates to an improved nose-check for cattle, and has for its object to provide a simple, inexpensive, and efficient device of this character capable of being readily attached to an animal's head and by means of which the animal is effectively prevented from demolishing fences and from pushing or butting other stock.

The invention consists in the construction and novel combination and arrangement of parts hereinafter fully described, illustrated in the accompanying drawings, and pointed out in the claims hereto appended, it being understood that various changes in form, proportion, and minor details may be resorted to without departing from the principle or sacrificing any of the advantages of this invention.

In the accompanying drawings, forming a part of this specification, Figure 1 is a perspective view of a nose-check constructed in accordance with my invention, showing the same attached to the animal's head. Fig. 2 is a longitudinal sectional view of the same.

Similar numerals of reference indicate corresponding parts in both figures of the drawings.

In carrying out the invention I employ a face plate or bar 5, which rests against the animal's head and extends from the nostrils to a point adjacent the horns of the animal, as shown. The upper end of the face plate or bar is inclined or beveled, as indicated at 6, to accommodate the base of the horns and to permit said bar to bear against the animal's head throughout its length. The bar 5 is retained in position by means of a headstall 7, the straps 8 and 9 of which pass through transversely-disposed openings 10, formed in said bar and are fastened in any suitable manner to the throat-strap, as shown. Mounted on the upper face of the bar 5 is a guard-strap 11, one end of which is rigidly secured thereto, as by screws or similar fastening devices 12, the opposite end of said strap being free to move outwardly and provided with downwardly-projecting terminal spurs or teeth 13, which pass through elongated slots 14 in the end of said bar and engage the animal's nostrils when the free end of the guard-strap is depressed.

The guard-strap 11 is provided with an intermediate hinged connection 15, and bearing against the free end of the strap at a point adjacent said hinge is one end of a flat spring 16, the opposite end of which is seated in a recess 17 and held in position on the bar by engagement with the fixed end of said guard-strap, as shown. The normal tendency of the spring 16 is to hold the free end of the guard-strap in elevated position; but should the animal press the strap against a fence or attempt to butt another animal the free end thereof will be forced downwardly, thereby carrying the spurs or teeth through the openings in the bar into contact with the animal's nostrils. The guard-plate is provided at a point adjacent the hinge 15 with openings 18, and passing through said openings and secured to the bar 5 are screws or pins 19, the enlarged heads of which engage said guard-plate and limit the outward movement thereof. The face plate or bar is provided with a transversely-disposed opening 20, and extending through said opening and held within the same by frictional contact with the walls thereof is a curved nose-clip 21, the depending spring-arms 22 of which engage the animal's nostrils and prevent lateral displacement of said bar.

From the foregoing description it will be seen that I have provided an extremely simple and efficient device that is positive in action and will not in any way interfere with the range of vision of the animal or prevent him from drinking or grazing.

Having thus described the invention, what is claimed is—

1. A nose-check for cattle comprising a face-bar one end of which is inclined or beveled and the opposite end thereof provided with slots or openings, a spring-pressed guard-strap secured to the face-bar and provided with terminal spurs adapted to pass through said openings when the strap is depressed, and a nostril-clip mounted on the face-bar.

2. A nose-check for cattle comprising a face-bar one end of which is inclined or beveled and the opposite end thereof provided with slots or openings, a spring-pressed guard-strap secured to the face-bar and provided with terminal spurs adapted to pass through the openings in said face-bar when the strap is depressed, a spring interposed between the guard-strap and the face-bar for normally holding said strap in elevated position, and a nostril-clip mounted on the face-bar.

3. A nose-check for cattle comprising a face-bar one end of which is inclined or beveled and the opposite end thereof provided with slots or openings, a guard-strap formed in two sections pivotally connected together, one section of which is rigidly secured to the face-bar and the opposite section free to move outwardly and provided with alined openings and terminal projecting spurs adapted to pass through the openings in the face-bar when the free end of said strap is depressed, a spring interposed between the fixed end of the guard-strap and the face-bar for normally holding the free end of said strap in elevated position, and pins secured to the face-bar and engaging the openings in the free end of the strap for limiting the outward movement of the latter.

4. A nose-check for cattle comprising a face-bar one end of which is inclined or beveled and the opposite end thereof provided with slots or openings, said bar being also provided with an intermediate transversely-disposed recess, a spring-pressed guard-strap secured to the face-bar and provided with terminal spurs adapted to pass through the openings in the face-bar when the strap is depressed, and a nostril-clip provided with depending spring-arms fitting within the transversely-disposed recess in said face-bar.

5. A nose-check for cattle comprising a face-bar one end of which is inclined or beveled and the opposite end thereof provided with slots or openings, a spring-pressed guard-strap secured to the face-bar and provided with terminal projecting spurs adapted to pass through said openings when the strap is depressed, and a spring seated in a recess in the face-bar for normally holding the guard-strap in elevated position by engagement with the fixed end of the guard-strap.

SAMUEL G. HOLLOWAY.

Witnesses:
   Isaac N. Chinowth,
   Nancy T. Chinowth.